Sept. 29, 1953          C. W. VOGT                2,653,813
        SUPPLYING ARTICLES FOR USE IN PACKAGING
Filed Sept. 2, 1949                      7 Sheets-Sheet 2
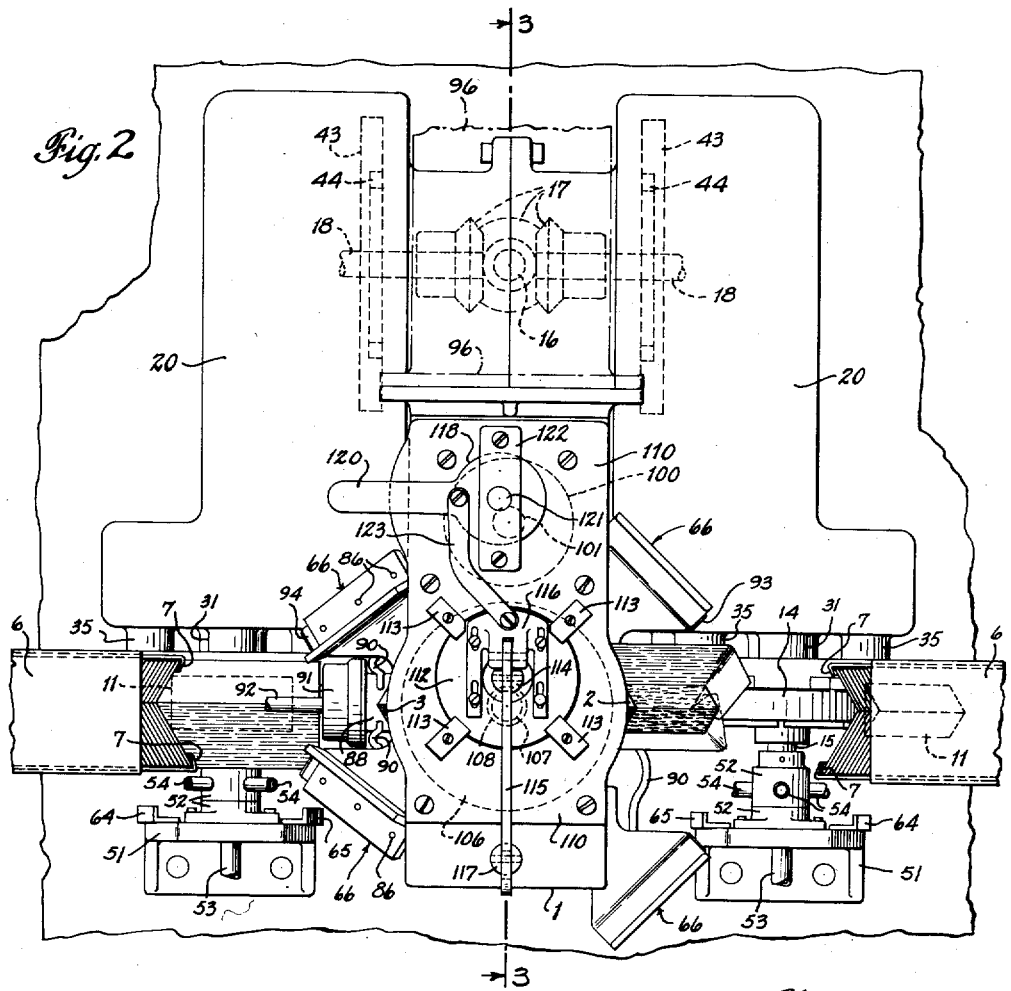
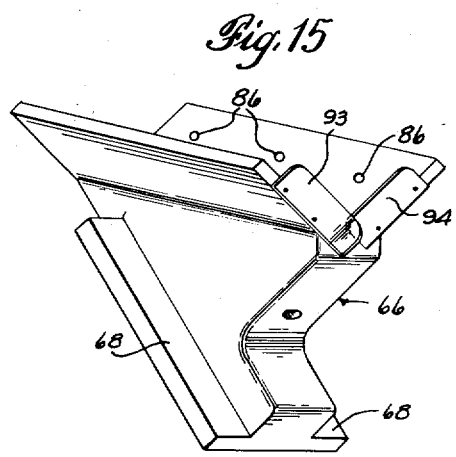
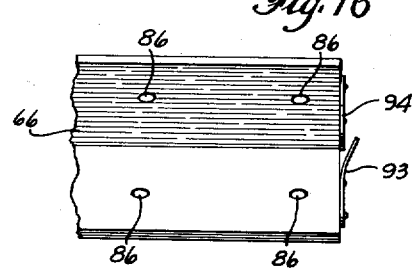
INVENTOR.
CLARENCE W. VOGT
BY
Hubert E. Evans
ATTORNEY.

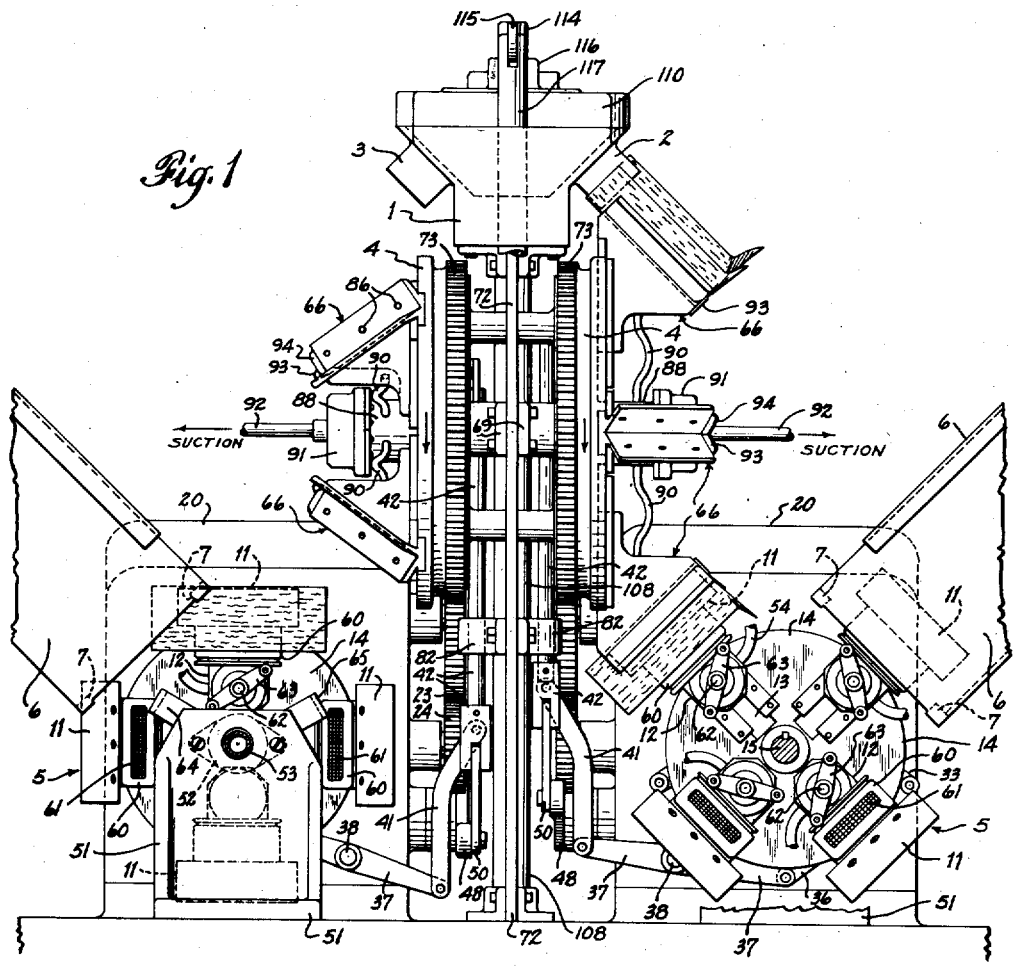

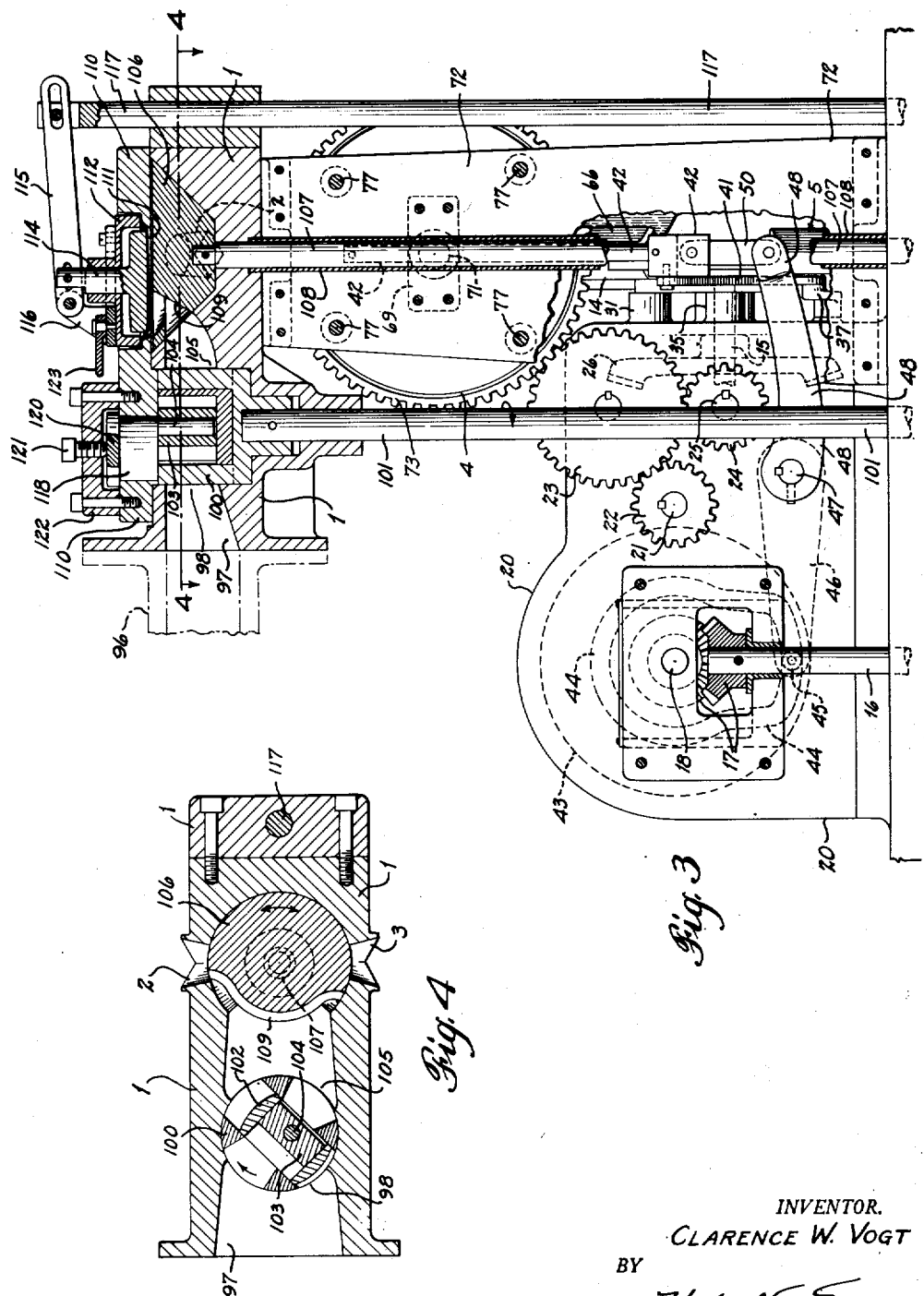

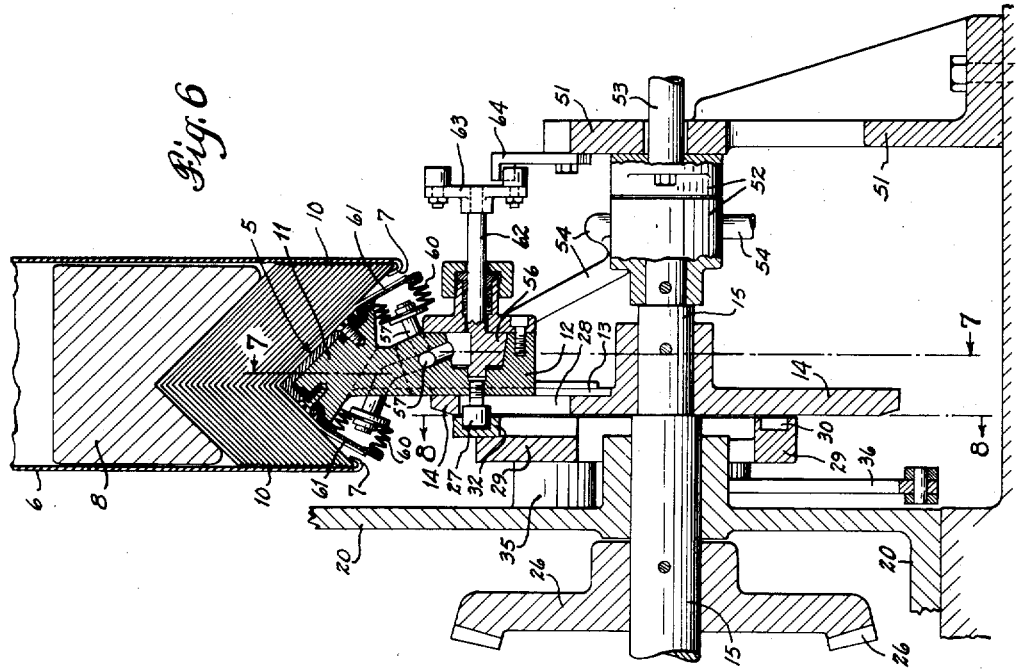
Sept. 29, 1953   C. W. VOGT   2,653,813
SUPPLYING ARTICLES FOR USE IN PACKAGING
Filed Sept. 2, 1949   7 Sheets-Sheet 4
INVENTOR.
CLARENCE W. VOGT
BY
Hubert E. Evans
ATTORNEY.

Sept. 29, 1953            C. W. VOGT            2,653,813
SUPPLYING ARTICLES FOR USE IN PACKAGING
Filed Sept. 2, 1949            7 Sheets-Sheet 5
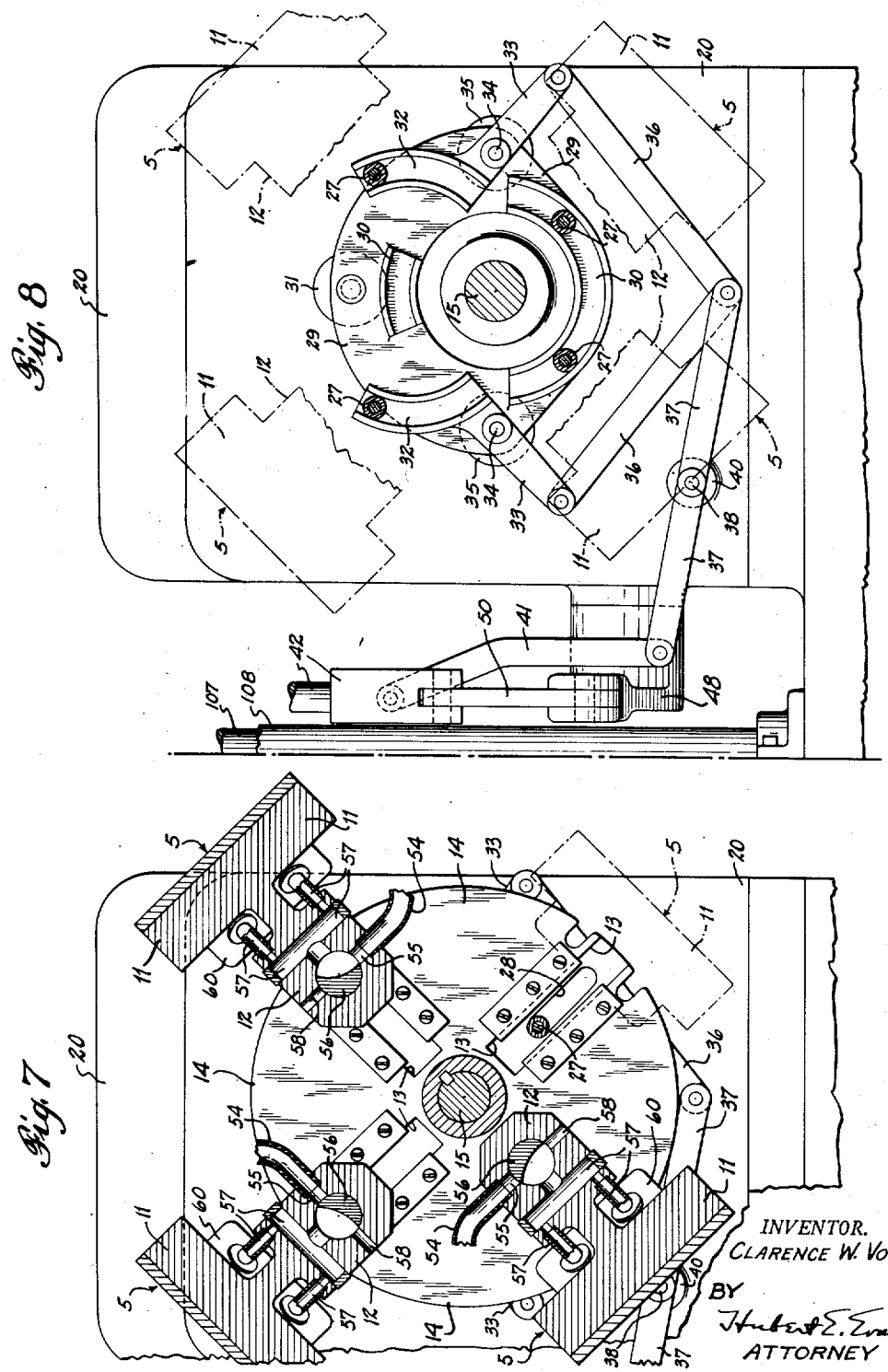
INVENTOR.
CLARENCE W. VOGT
BY
Hubert E. Evans
ATTORNEY Sept. 29, 1953  C. W. VOGT  2,653,813
SUPPLYING ARTICLES FOR USE IN PACKAGING
Filed Sept. 2, 1949  7 Sheets-Sheet 6
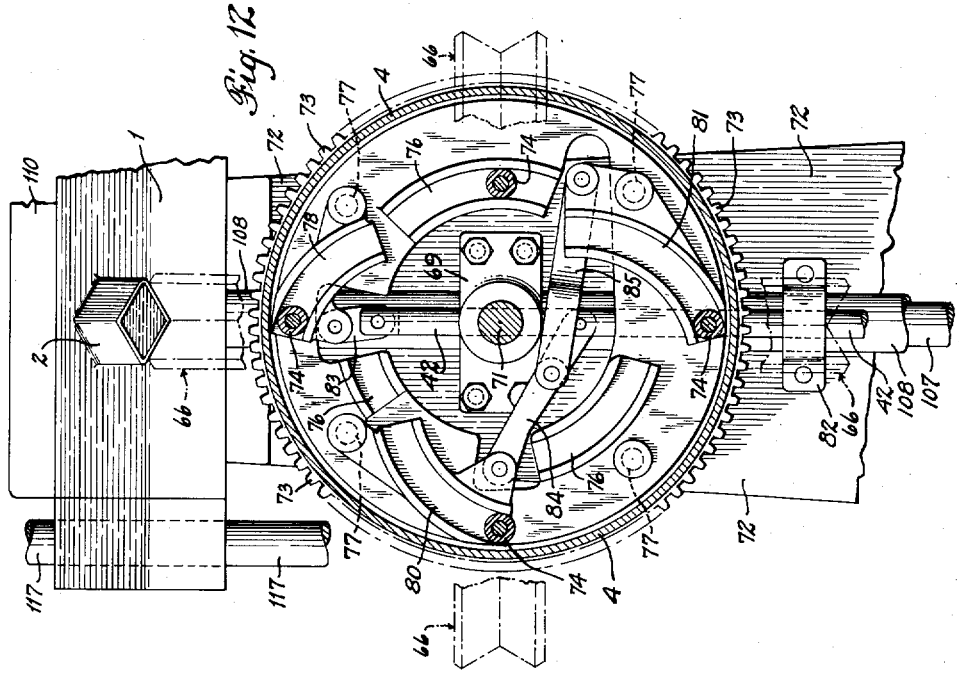
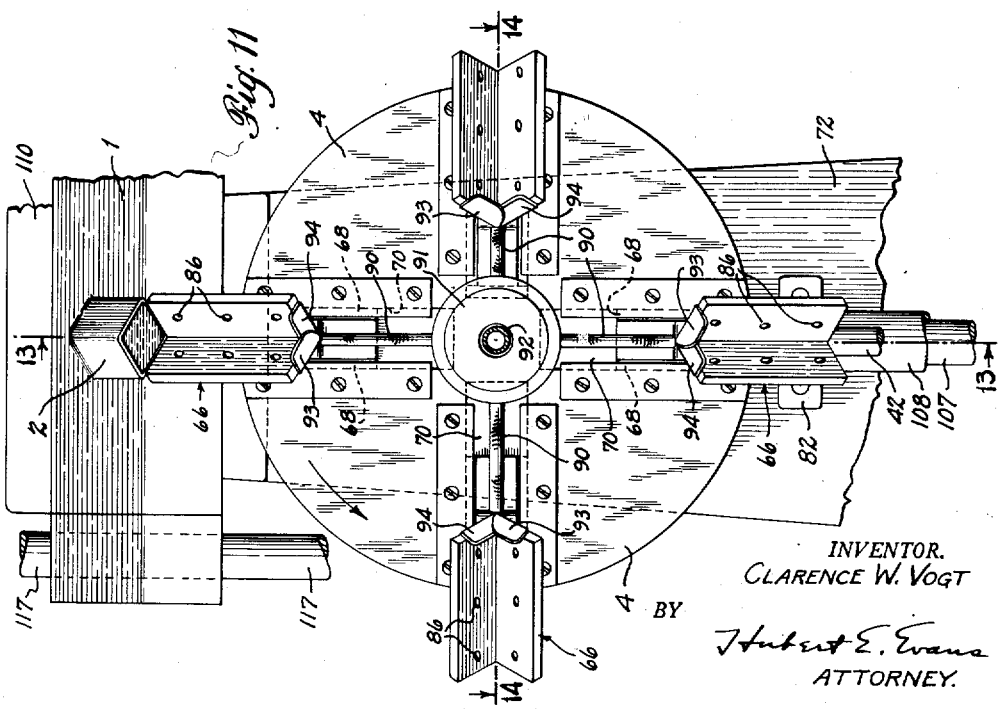
INVENTOR.
CLARENCE W. VOGT
BY
Hubert E. Evans
ATTORNEY.

Sept. 29, 1953             C. W. VOGT            2,653,813
SUPPLYING ARTICLES FOR USE IN PACKAGING
Filed Sept. 2, 1949                          7 Sheets-Sheet 7
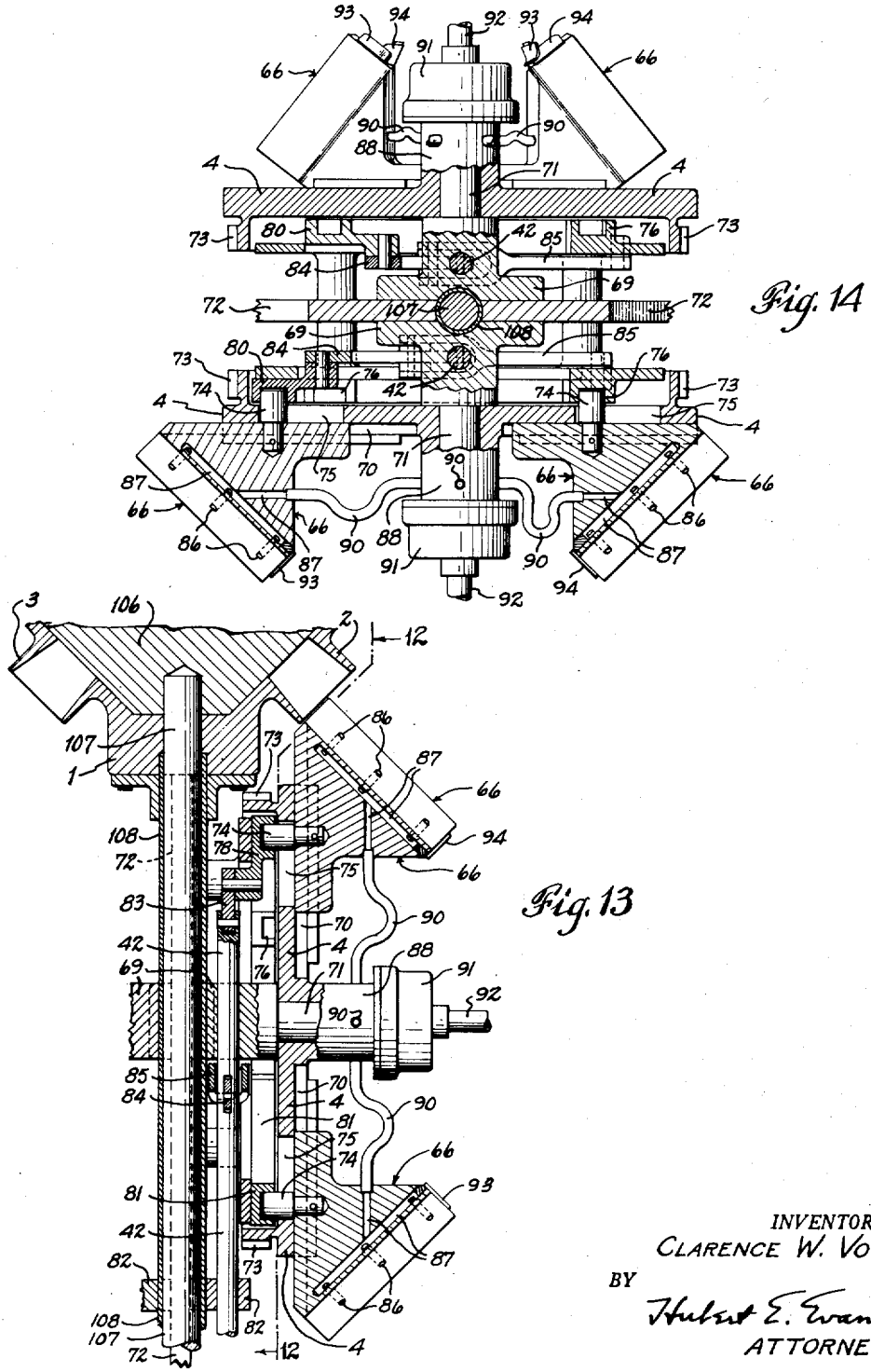
INVENTOR.
CLARENCE W. VOGT
BY
Hubert E. Evans
ATTORNEY Patented Sept. 29, 1953

2,653,813

UNITED STATES PATENT OFFICE 2,653,813

SUPPLYING ARTICLES FOR USE IN PACKAGING

Clarence W. Vogt, Norwalk, Conn.

Application September 2, 1949, Serial No. 113,735

15 Claims. (Cl. 271—1)

This invention relates to the feeding and applying of articles formed of sheet material and in particular to the supplying of articles in a sequence from a source of supply to a position of use where the articles may be precisely applied to a predetermined location. In general the articles are adapted to be used in connection with packaging operations and include enwrapments, labels, partial or complete bands or overwraps and the like.

This application is a continuation-in-part of my copending application Serial No. 99,611, filed June 17, 1949, and entitled Supplying Sheet Material Articles.

In the supplying of articles for use in packaging many such articles may be prepared in advance such as by printing and scoring, etc., with such advance preparations being incorporated in registry with the dimensions of each of the articles. However, the feeding of such articles, whether from a continuous web or individual sheets, is not controlled with sufficient accuracy in present commercial practice, and at the position of use the articles are not applied precisely in registry. Accordingly when they are associated with a package or commodity, they are not uniformly applied and the benefit of the precise location of the preparations incorporated in the article is lost. It is therefore an object of the present invention to provide a method of and apparatus for supplying a succession of articles which may be applied to a precise position of use in registry for such use, so that the packages or commodities with which the articles are to be associated may all have a uniform appearance.

Another object is to provide a method of and apparatus for feeding and applying articles which facilitates the selection and feeding of a single article. In the selection and feeding of articles such as labels or wrappers it has been found difficult to select and feed only one article and in a number of applications when more than one article is selected and fed, serious operating difficulties are encountered. The selection of more than one enwrapment may result in damage to the wrapping mechanism and even breakdown of the wrapping equipment. In connection with the labeling of products which, due to their high cost or other characteristics, are handled in closely controlled lots, the selection and application of more than one label detrimentally affects the control of the product. To illustrate, many such labels are coded and therefore unless fed singly and in succession the coding system will be adversely affected.

A further object is to provide a method of and apparatus for supplying a succession of articles on a continuous basis to avoid stopping the feeding mechanism when it is necessary to add to the source of supply of the articles. Where such articles are being supplied for use with commodities handled on a continuous operating cycle, shutdowns in the cycle may be exceedingly costly and may appreciably affect the quality or other physical characteristics of the commodity.

Another object is to provide a method of and apparatus for feeding and applying a succession of articles which permits operation at increased speeds with a resultant increase in efficiency and lowering of cost.

A further object is to provide a method of and apparatus for supplying articles in which the articles may be obtained from a relatively compact group and may be conveyed and applied in succession with the desired spacing between adjacent articles at their position of use.

A further object is to provide a method of and apparatus for feeding sheet material articles in the form of a plurality of nested trough-like sections in which the withdrawal of a single article is facilitated by the stepped or echeloned arrangement of the side edges of the trough-like articles.

A still further object is to provide a method of and apparatus for feeding prescored V-shaped articles to permit the use of heavier more rigid sheet materials and provide increased protective packaging.

Other objects and advantages will become apparent from the following detailed description accompanied by the drawings in which:

Figure 1 is a front elevational view with parts broken away of a mechanism embodying the present invention;

Fig. 2 is a top plan view of the mechanism shown in Figure 1;

Fig. 3 is a central sectional view taken substantially on line 3—3 of Fig. 2;

Fig. 4 is a fragmentary sectional view to illustrate interior portions of the mechanism taken substantially on line 4—4 of Fig. 3;

Fig. 5 is an enlarged elevational view of the article feeding portion of the mechanism shown in Figure 1;

Fig. 6 is an enlarged fragmentary sectional view taken substantially on line 6—6 of Fig. 5;

Fig. 7 is an enlarged sectional view taken substantially on line 7—7 of Fig. 6;

Fig. 8 is an enlarged fragmentary sectional view taken substantially on line 8—8 of Fig. 6;

Fig. 9 is an enlarged normal plan view of a portion of the container for supporting a plurality of articles;

Fig. 10 is a normal view of the open end of the container for supporting a plurality of articles;

Fig. 11 is an enlarged side elevational view, with parts broken away, of a portion of the mechanism;

Fig. 12 is an enlarged sectional view taken substantially on line 12—12 of Fig. 13;

Fig. 13 is an enlarged sectional view taken substantially on line 13—13 of Fig. 11;

Fig. 14 is an enlarged sectional view taken substantially on line 14—14 of Fig. 11;

Fig. 15 is an enlarged perspective view of a support member for receiving the articles; and Fig. 16 is an enlarged fragmentary plan view of a portion of the support member shown in Fig. 15.

Briefly, the present invention comprises the method of and apparatus for furnishing sheet material articles generally for use in packaging and similar operations. A plurality of the articles may be retained by a suitable support in position to permit extraction or withdrawal of individual articles therefrom. The member accomplishing the extraction may then advance the article to a predetermined position with respect to a receiving support. The article is applied to such receiving support in accurate and precise registry for utilization.

An illustrative and preferred form of article for use in the present invention comprises a section of sheet material which may generally be of rectangular outline and have a fold line intermediate two opposite marginal edges thereof so that the article may be folded along such fold line to a generally V-shaped configuration. The angularly disposed sides of the V may be divergent so that the articles may be described as trough-like. A plurality of the articles may be supported in an inverted or nested relationship with the sides of the V's directed generally downwardly and outwardly from each other. In this position the extraction of single articles may be more readily accomplished, since the free marginal edge portions of the articles are arranged in stepped or echeloned relationship.

The fold line or apex of the article is an important feature. It affords an index point which permits accurate and precise registry of the article with respect to the commodity with which the article is to be associated and also with respect to the apparatus utilized to select, feed and apply the article. For example, in the case of a wrapper the sheet material section may be dimensioned to correspond to the object or commodity to be enclosed and the apex of the folded sides may be precisely located with respect to the edge portions thereof so that it will correspond to a corner edge of the completed package. Available commercial apparatus can fabricate each article to provide a prescored fold line which will be in precise registry with edge portions of the sheet material, and further, may be in precise and accurate registry with printed matter, other score lines, etc., which may be incorporated in the wrapper. By depositing the objects or commodity onto the wrapper while it is in an open V configuration with a corner edge of the commodity precisely aligned with the apex of the V, uniform wrapped packages may be readily provided. All of the advertising, printed matter, trade-marks, etc., may be disposed at the same position on each package.

The term article as used in describing the present invention refers to a section of sheet material which has been fabricated to provide an enwrapment, a pair of enwrapments, a label, a pair of labels, a partial or complete band or overwrap, or other similar product useful in connection with packaging operations. The sheet material may comprise any suitable fibrous, cellulosic, metallic, or synthetic film or sheet having sufficient flexibility to permit its use in packaging. For many applications laminated or composite sheet materials are especially desirable. Also, the sheet material may be provided with partial or complete reinforcement according to the use to which it is to be put. Examples of articles for use in the present invention are shown and described in my copending applications Serial No. 83,044, filed March 23, 1949, and entitled Articles for Use in Packaging; Serial No. 79,591, filed March 4, 1949, and entitled Receptacle; Serial No. 83,931, filed March 28, 1949, and entitled Package, now abandoned, and Serial No. 100,944, filed June 23, 1949, and entitled Articles for Use in Packaging.

During its fabrication the article may be provided on either or both surfaces with suitable score lines, fold lines, cut score lines, registry indicia, adhesive spots, stripes or areas, decorative or functional coatings, and obviously may be provided with printing, advertising matter, trade-marks, decorative embossing, or the like. Further, the article may at the time of fabrication or at the time of use be provided with suitable coding to facilitate identification of the article and the object or commodity with which it becomes associated.

The present invention will be described in connection with an apparatus for forming and packaging masses of plastic material such as butter, margarine, lard, soap, confections, partially frozen ice cream and the like. However, it will be seen that this is for purposes of illustrating a preferred embodiment and is not to be construed as limiting the scope or application of the invention.

In the drawings and particularly Figs. 1, 2, and 3 the numeral 1 indicates the casing or housing of a unit for forming plastic masses which are alternately delivered through forming apertures or nozzles 2 and 3. A plurality of support members carried in an endless path such as by wheels 4 may be mounted to move successively into receiving position adjacent the nozzles 2 and 3 to receive and carry away plastic masses. Adjacent each of the wheels 4 a plurality of wrapper feeding members indicated generally by the numeral 5 may be provided to advance and apply wrappers which have been extracted from a container or hopper 6 which constitutes a source of supply of the wrappers.

Figs. 9 and 10 are enlarged views of one of the containers or hoppers 6, illustrated as comprising a rectangular shaped body open at its lower end to permit the withdrawal of single wrappers therefrom. The wrappers are preferably disposed in the hopper so that the V's open downwardly with the free side edges of the V's being retained by retaining elements or lips 7. To maintain the wrappers in position, a suitable weight 8 may be slidably mounted in the hopper to press against the top of the stack of nested wrappers. To replenish the supply of wrappers it is only necessary to lift the weight 8 from the open top portion of the hopper and add an additional stack of nested wrappers. Figs. 6 and 9 illustrate the stepped or echeloned arrangement of both free edges of adjacent wrappers in the area indicated by numeral 10.

It will be noted that single enwrapments may be readily withdrawn from the hopper by plucking or taking hold of the leading one and withdrawing it to extricate it from the retaining elements. An especially desirable way of withdrawing single wrappers is to take hold of one or both sides of a wrapper in the region of the free edge or edges and to bend or flex such free edge portions until they are free of the retaining elements 7. Withdrawal of single wrappers is facilitated by the fact that lifting the free edges from the lips permits the entrance of air between the lowermost wrapper and the next adjacent wrapper, and minimizes any tendency they may have to cling together. Thus it is preferable that the feed members 5 enter the open lower end of the hopper to engage surfaces of the leading one of the stack of wrappers, taking hold of the wrapper and flexing its outer free edge portions thereof to free them from the retaining lips 7. It is also beneficial for the feed member to slightly raise the stack of wrappers sufficiently to straighten out their angularly disposed surfaces and insure proper contact with the leading one. With the feed member holding the freed wrapper, it may withdraw, and advance the wrapper to a position of use where it will be applied. To best carry out this action it is desirable to provide a plurality of feed members which move in succession through a closed path with each feed member withdrawing, advancing, and applying a wrapper.

Figs. 5, 6, 7, and 8 illustrate a mechanism for carrying four feed members and actuating them with a radial movement as well as a rotary movement. It may be seen from Figs. 1 and 2 that since plastic masses will be formed at each side of the housing 1 at the forming nozzles 2 and 3, that two identical mechanisms for supplying enwrapments will be necessary—one on each side of the housing. Since these mechanisms are substantially identical in construction and operation, only one will be described.

Each of the feed members 5 comprises a head portion 11 having angularly disposed surfaces conforming generally to the interior surfaces of the trough-like wrappers. The head portion is integrally connected with a stem portion 12 having flanges mounted for sliding movement in a track or groove 13 formed in a wheel 14 carried for rotation by a shaft 15. The shaft 15 may be driven intermittently to provide the desired rotary movement of the wheel 14 at proper timed intervals.

Figs. 2 and 3 show a driving shaft 16 which drives, through bevel gears 17, a pair of shafts 18 mounted for rotation perpendicularly to the shaft 15. Each of the shafts 18 transmits rotary power from the driving shaft 16 through an appropriate gear train or other mechanism to the shaft 15 carrying the wheels 14. Such a gear train may be mounted within a housing 20 which also provides journals for the shafts 18. Fig. 3 illustrates in diagrammatic fashion portions of the gear train which is believed will be sufficient to permit an understanding of the drive. The shaft 18 has mounted thereon portions of an appropriate driving mechanism (not shown) to drive with the desired intermittent characteristics a shaft 21. The intervening mechanism between the shaft 18 and the shaft 21 may be any suitable conventional mechanism which will give the desired dwell characteristics to the shaft 21.

For example, a Geneva drive may be interposed between these shafts. Another satisfactory gear train for obtaining a periodic dwell of the shaft 21 comprises a three-gear motion utilizing three identical gears, the first of which is eccentrically driven by the driving shaft. The other two gears are mounted concentrically, one on a floating shaft and one on a driven shaft mounted in a stationary journal. The three gears are connected by a pair of links, free ends of which are pivotally connected to the concentric centers of the gears. Continuous rotation of the driving shaft will cause an intermittent rotation of the driven shaft. Such a unit is disclosed in Figs. 10 and 11 of my copending application Serial No. 56,941, filed October 28, 1948, and entitled Apparatus for and Method of Chained Enwrapments. If such a gear train is utilized the shaft 21 may comprise the driven shaft of the unit.

The shaft 21 extends outwardly from the housing 20 and carries for rotation a gear 22 which meshes with and drives a gear 23 which in turn meshes with and drives a gear 24 mounted on a stub shaft 25 (see Fig. 3). The shaft 25 carries a bevel gear (not shown) which meshes with and drives a bevel gear 26 (see Fig. 6), mounted for rotation on the shaft 15 which as described carries the wheel 14. Thus, continuous rotation of the driving shaft 16 will produce intermittent rotary motion of each of the shafts 15 and the wheels 14 which carry the members 5.

It is also desired to provide radial movement of the feed members 5 with respect to the wheel 14 at the time when the wheel 14 is dwelling between rotary movements thereof. To accomplish this motion each of the stem portions 12 of the feed members 5 carries a roller 27 extending outwardly therefrom and engaged simultaneously by a radial slot 28 in the wheel 14 and by a cam track 30. Portions of the cam track 30 are fixed and may be carried by a member 29, apertured to receive the shaft 15, and mounted on a fixed boss 31 extending outwardly from the housing 20. However, the cam track has a pair of separable segments 32 secured to levers 33 and mounted for pivotal movement about pivots 34 mounted on stationary bosses 35 extending from the housing 20 (Figs. 3 and 8). The pivots 34 also pass through apertures in the member 29 to hold it in fixed position. During the dwell of the wheel 14 the movable segments 32 may be pivotally moved and the rollers 27 in those portions of the cam track will be moved radially outwardly while guided by the radial slots 28 to advance the head portions 11 of the feed members 5 to their radial outward position. Viewing Figs. 7 and 8, the two upper feed members are thus moved radially outwardly while the two lower feed members remain stationary since their rollers 27 are disposed in the stationary portions of the cam track 30.

To actuate the segments 32 of the cam track 30, the levers 33 are each pivotally connected to the ends of a pair of links 36 and the opposite ends of the links 36 are pivotally connected at a common point to an oscillating arm 37. This arm oscillates about a pin 38 carried by a stationary boss 40 extending integrally from the housing 20 (see Figs. 3 and 8). The opposite free end of the oscillating arm 37 is driven by a link 41 which is pivotally connected at one end to the arm 37 and at its opposite end is pivotally connected to an end of a reciprocating rod 42, as may best be seen in Fig. 8. The reciprocating rod 42 is driven from a disk cam member 43 mounted on the shaft 18 within the housing 20. The cam 43 is provided with a suitably shaped cam track 44 which influences a follower 45 carried by an arm 46. The opposite end of the arm 46 is mounted for movement on a rocker shaft 47 which extends through the wall of the housing 20 and on the exterior of the housing carries a rocker arm 48 which drives the reciprocating rod 42 through a link 50 pivotally connected at one end to the rocker arm 48 and at its opposite end to the reciprocating rod 42.

In operation the shaft 18 rotates continuously and as stated, drives the shaft 15 and the wheel 14 intermittently. The cam track 44 of the disk cam 43 is designed and constructed so that while the shaft 15 is dwelling the rod 42 is reciprocated first with an upward motion and then with a downward motion (see Fig. 3). As shown in Fig. 8 upward movement of the rod 42 causes the oscillating arm 37 to move in a clockwise direction pulling downwardly on the links 36 and the levers 33 to pivot the movable segments 32 outwardly from their normal position in alignment with the stationary portions of the cam track 30. The two feed members 5 whose rollers are disposed in the segments 32 at that time, are accordingly moved to their outward radial position, as shown, so that one of them may be brought into engagement with the lowermost wrapper in the source of supply held by the hopper 6 while the other moves outwardly to apply a previously extracted wrapper to a receiving support member. The cam track 44 of the cam 43 then causes the reciprocating rod to descend and by a reverse operation of the mechanism just described, the segments 32 return to their normal position moving the feed members 5 to their radial inward position. The wheel 14 and its shaft 15 may then be rotated for 90° at which time they dwell to permit the feed members to be actuated again so that a previously withdrawn wrapper may be deposited while still another wrapper is withdrawn from the source of supply.

To facilitate withdrawing of the wrappers and proper positioning thereof during advancement by the feed members, it is desirable to securely hold the wrappers and for this purpose a vacuum grip is considered preferable. Figs. 5, 6, and 7 illustrate a mechanism for exhausting air from the feed members at the desired time. A stationary bracket 51 mounted on the base of the apparatus supports a vacuum manifold and rotary seal 52 which connects a stationary conduit 53 leading to a suitable vacuum pump (not shown) with a plurality of flexible conduits 54 which are connected to the rotating portion of the manifold 52 and communicate with each of the head portions 11 of the feed members 5 to exhaust air therefrom to the conduit 53. The rotary portion of the manifold 52 may be mounted on and secured to the shaft 15. Each of the flexible conduits 54 connects between the manifold 52 and a port 55 located in the stem portion 12 of each of the feed members 5.

Adjacent the port 55 and mounted in the stem 12 is a rotary valve 56 to provide communication between the port 55 and a passage 57 leading to the head portion 11 of the feed member 5 during desired times in the operating cycle of the feed member 5. At other times in the operating cycle the valve 56 is turned so that the port 55 is closed and the passage 57 is in communication with a vent opening 58. The passage 57 communicates with a pair of bellows-like members 60 which are mounted on each of the angularly disposed faces of the head portion 11 of the feed member 5. The air passages through the members 60 open to the surface of the angularly disposed faces through foraminous or screen elements 61. The rotary valve 56 is mounted on an oscillating stem 62 which carries at its outer end an arm 63 extending outwardly in two directions from the stem to oscillate the stem and switch the valve. Mounted on the bracket 51 and extending outwardly therefrom are a pair of detents 64 and 65 which actuate the arm 63 and the valve 56 to connect and disconnect, respectively, the port 55 and the passage 57.

Looking at Fig. 5 the wheel 14 with the feed members 5 rotates in a counterclockwise direction and as the wheel approaches its dwell period it brings one of the feed members 5 into position below the hopper in the upper right-hand quadrant. As the feed member is moved radially outwardly the detent 64 contacts the arm 63 moving the valve stem 62 and the valve 56 to place the passage 57 into communication with the port 55 and the flexible conduit 54 to permit air to be exhausted from the bellows members 60. When the head portion 11 of the feed member 5 reaches its radial outward position the angular faces thereof are brought into contact with the lowermost wrapper in the hopper and the exhausting of air through the bellows members 60 causes the edge portions of the wrapper to be gripped throughout the region of the foraminous member 61. The bellows members 60 are shown in cross section in Fig. 6 and have unequal wall portions of a flexible and preferably an elastic material, such as synthetic rubber or the like. As air is exhausted from the bellows members, their unequal wall portions cause them to collapse as shown in Fig. 6, and since the members 60 hold edge portions of the wrapper, such edge portions are bent or flexed, freeing the wrapper from the retaining lips 7 (Fig. 6).

The feed member 5 then moves to its inward position and the wheel 14 advances 90° so that the feed member with its gripped wrapper moves to the upper left-hand quadrant when viewing Fig. 5. The wheel 14 dwells in this position and at this point the end of the arm 63 opposite to that contacted by the detent 64 is brought into position adjacent the detent 65. When the feed member 5 is moved to its radial outward position, engagement of the arm 63 with the detent 65 switches the valve 56, closing the port 55 and placing the passage 57 in communication with the vent opening 58. Air enters the vent 58 and flows into the bellows members permitting them to expand and release their grip on the wrapper thus applying the wrapper to a receiving support member. The feed member is returned to its radial inward position and the wheel 14 advances to repeat the operating cycle.

In the upper left-hand quadrant of the wheel 14, shown at the right-hand side when looking at Fig. 1, the feed member 5 is shown at the moment of deposit with the wrapper being applied to a receiving support member 66. In the form of the invention shown in the drawings the member 66 is one of a series of similar members which successively receive wrappers and carry them past one of the forming nozzles to permit a plastic mass to be deposited therein for packaging. The plurality of members 66 may be carried by any suitable mechanism causing them to move past the station at which wrappers are applied thereto and thence to a point adjacent one of the nozzles. To correspond with the construction for withdrawing and feeding wrappers the drawings illustrate four receiving members mounted on a wheel 4 for radial and rotary motion. It will be obvious that the support members 66 and the wheels 4 are provided on each side of the housing 1 and adjacent each of the nozzles 2 and 3. But, since the construction on each side of the housing is substantially identical only one of the mechanisms will be described in detail.

Fig. 15 is an enlarged view of one of the members 66 and it may be seen that it is provided with a pair of angularly disposed surfaces substantially complementary to the exterior surfaces of the wrappers and to the angularly disposed surfaces of the wrappers and to the angularly disposed surfaces of the head portion 11 of the feed members 5. Each of the members 66 is provided with a flange portion 68 which is received in a recess or slideway 70 provided in the wheel 4 to permit radial sliding movement of the member 66. Each of the wheels 4 is mounted for rotation on a stub shaft 71 (Fig. 13) journaled in and supported by a bracket 69 bolted to a frame member 72 which extends from the base of the machine up to the housing 1. Intermittent rotary motion of each wheel 4 may be obtained from the shaft 18 within the housing 20 which as previously stated drives the shaft 21 with an intermittent motion. Fig. 3 shows the gear 22 on the shaft 21 meshing with and driving the gear 23 which in turn meshes with and drives a ring gear 73 carried on the periphery of the wheel 4.

Figs. 11 through 14 best illustrate the mechanism for obtaining radial motion of the members 66 with respect to the wheel 4. Each of the members 66 carries a roller follower 74, a portion of which is mounted in a radial slot 75 formed in the wheel 4 to limit and guide the radial movement of the member 66. Another portion of the roller 74 is disposed in a circular cam track having fixed portions 76 as may best be seen in Fig. 12. These fixed portions 76 of the cam track are carried by a single member secured to the frame 72 by bolts 77 which pass through the frame 72 and connect the fixed portions 76 for both of the wheels 4 to the frame of the apparatus. The cam track is also provided with 3 movable segments 78, 80, and 81 disposed at the top left-hand portion and bottom respectively, of the cam track when viewing Fig. 12. Each of the movable segments 78, 80 and 81 is mounted for pivotal movement on one of the bolts 77.

Accordingly during the dwell of the wheel 4 the segment 81 may be pivoted and will cause roller follower 74 of the lowermost member 66 (viewing Fig. 12) to move radially outward in a downward direction for the purpose of receiving a wrapper from one of the feed members 5. Simultaneously therewith the segment 78 may be pivoted and it will cause the follower 74 disposed therein to move the uppermost member 66 (to which a wrapper has been previously applied) into receiving position with respect to the nozzle 2. Also, at the same time the segment 80 may be pivoted to cause the roller 74 contained therein and its associated member 66 disposed at the left-hand side of Fig. 12 to move radially outwardly and discharge a plastic mass and associated wrapper which has preferably been folded to enclose the mass.

The pivotal movement of the segments 78, 80 and 81 may be obtained from the previously referred to reciprocating rod 42 which as described obtains its reciprocation from the cam 43 mounted for rotation on the shaft 18. The cam 43 through the follower 45 and the arm 46 causes the shaft 47 to oscillate. The rocker arm 48 carried on the shaft 47 through the link 50 causes reciprocation of the rod 42. Fig. 13 shows the rod 42 as being guided during its reciprocating motion by the bracket 69 carried by the frame 72 and at its lower end by a sleeve 82 bolted to the frame member 72. The upper end of the rod 42 is pivotally connected to an end of a link 83 the other end of which is pivotally connected to the segment 78. A link 84, connected at one end to the segment 80 and at its opposite end to the reciprocating rod 42, will produce the desired pivotal motion of the segment 80. At the same time pivotal motion of the segment 81 may be obtained by pivotally connecting an end of a link 85 to the segment 81 with the opposite end of the link 85 being pivotally connected to an intermediate portion of the link 84 (see Fig. 12).

Thus, upward movement of the rod 42 will cause the pivotally mounted segments 78, 80, and 81 to move the three support members 66, indicated by dot and dash outline at the top, left-hand, and bottom sides of Fig. 12 respectively, to their radial outward positions. While the wheel 4 is still at rest, the rod 42 will move downwardly to return the three support members 66, just referred to, to their radial inward position. It may be noted that during the pivotal movement of the segments 78, 80, and 81 to cause movement of three of the support members, the fourth support member 66 (indicated by dot and dash outline at the right-hand side of Fig. 12) remains stationary since its follower 74 is disposed during the dwell of the wheel in one of the fixed portions 76 of the cam track. After each upward and downward reciprocation of the rod 42 the wheel 4 ends its dwell period and is rotated 90°, which advances each of the members 66 to the next station where the wheel 4 dwells and the operating cycle is repeated.

From the time that the wrappers are applied to the members 66 until a wrapper and associated mass of plastic material are discharged, it is deemed preferable that the wrapper be held with respect to the support member to assure that it is properly positioned and that each plastic mass will be deposited onto its wrapper at precisely the same location. Mechanical gripping means may be utilized but it is believed preferable to employ a vacuum gripping mechanism. For this purpose Figs. 13, 15 and 16 show the angularly disposed receiving surfaces of each member 66 as provided with openings 86. These openings are in communication with passages 87 through the members 66 to withdraw air from the angularly disposed surfaces. The passages 87 through each of the members 66 are connected to a rotating hub portion 88 by flexible hose members 90. The hoses 90 permit withdrawal of air from the openings 86 during radial movement of the members 66.

Also connected to the hub 88 is a stationary valve and manifold member 91 from which air may be withdrawn by a conduit 92 leading to a suitable vacuum pump (not shown). The member 91 may be of any suitable conventional construction to place the vacuum pump and conduit 92 in communication with the flexible hose portions 90 during rotary movement of the hub 88 with respect to the member 91 for the desired time period. As stated it is desired that air be exhausted from the flexible hose portions 90 from approximately the time that their associated support member 66 is disposed at the station where it is to receive a wrapper until such member 66 has moved to the station where the wrapper and plastic mass are to be discharged.

When viewing Fig. 1 the lowermost member 66, at the right-hand side, is shown in its wrapper-receiving position and as the wheel 4 commences its dwell at this point air is withdrawn through the hose portion 90, the passage 87 and the openings 86. The member 66 has been moved to its radial outward position at which time the corresponding feed member 5 applies a wrapper thereto with the apex or folded portion of the wrapper being precisely aligned with the intersection or apex of the angularly disposed receiving surfaces of the member 66. As previously described radial outward movement of the feed member 5 switches the position of the valve 56 venting the air passages through the screen 61 to the venting opening 58, and releasing the wrapper on the feed member. Conjointly with the release of the wrapper by the feed member 5 it is applied to the angularly disposed surfaces of the member 66 and securely gripped due to the vacuum caused by withdrawal of air through the openings 86. The member 91 is designed to continue the withdrawal of air through the hose portion 90 while the member 66 advances past the receiving station where a plastic mass is deposited onto the wrapper (illustrated at the upper right-hand portion of Fig. 1) and until the member 66 discharges the wrapper and plastic mass. At this position the air openings 86 are no longer in communication with the vacuum pump and during the dwell of the wheel 4 at this station the member 66 moves outwardly to discharge the wrapper and plastic mass. Figure 1 illustrates the discharge position by showing the member 66 (in the middle at the right-hand side of the casing 1) after the wrapper and plastic mass have been removed therefrom.

Since, in the form of the invention shown in the drawings, the forming nozzles 2 and 3 and the receiving surfaces of the members 66 are disposed at a downwardly inclined angle, it may be desirable to close the outer end portions of the trough-like wrapper to prevent any movement of the plastic mass beyond its predetermined position on the wrapper. To accomplish this the end portion of the wrapper in the region of the apex may be closed and further, this may be done at the time the wrapper is applied by the feed member 5 to the support member 66. To permit the formation of end folds to enclose the plastic mass the wrappers are dimensioned so that they extend beyond the ends of the plastic mass while the feed members 5 and the support members 66 have a dimension approximately corresponding to the length of the plastic mass. Thus the end portions of the wrapper extend beyond the outer end of the member 66 (that is the side away from the nozzle) and such portions may be flexed or folded particularly in the region of the apex to close the same. As shown in my copending application Serial No. 110,635, filed August 16, 1949, and entitled Production of Formed Masses of Plastic Material, the outer edges of the receiving surfaces of the member 66 may be provided with flange portions 93 and 94 disposed on the leading and trailing sides of the angularly disposed receiving surfaces (see Figs. 15 and 16). These flange portions are dimensioned and positioned so that they are in slightly-spaced overlapping relationship with one another and as the wrapper is applied to the member 66 the apex at the region of the outer edge portions of the wrapper is received between the flange members 93 and 94 and inclined toward the trailing flange 94 to close the apex of the wrapper. This closed position may best be seen in Figs. 1 and 2.

The formation of the plastic masses and their deposition onto the enwrapments (wrappers) and receiving members 66 is more completely disclosed in my previously referred to copending application Serial No. 110,635. Such forming mechanism comprises a source of supply of plastic material under pressure, a metering device to receive plastic material and advance it at a predetermined rate, with means for alternately directing such predetermined flow to one of a plurality of forming apertures.

Figs. 2, 3, and 4 illustrate this portion of the mechanism. The source of supply, which may vary according to the type of plastic material, is illustrated as an end portion of a conduit indicated by dot and dash lines 96 in Figs. 2 and 3. In the case of some plastic materials the source of supply may comprise a suitable conduit through which plastic material is advanced under pressure preferably with a continuous flow of the plastic. For example, in the case of butter the source of supply may be a conduit having a suitable helical screw mounted for rotation within the conduit so that chunks of butter may be manually fed to the screw and advanced. In the case of plastics which may be manufactured on a continuous process basis, the source of supply may be the apparatus for continuously producing the plastic material.

The plastic material from the source of supply enters inlet 97 of the casing 1 which inlet is in communication with the intake port 98 of a suitable metering device (see Fig. 4). The metering device is preferably continuously operable and for most plastics may be a positive displacement type of pump. The pump or metering device may comprise a unit of the type shown in the Waite Patents Nos. 1,867,198, granted July 12, 1932, and 2,018,692, granted October 29, 1935. Such pump may comprise a rotor 100 carried by a continuously driven shaft 101. The rotor is generally cylindrical in shape and is provided with a diametrically disposed groove or recess in which a piston member 102 is slidably mounted. The piston 102 is also provided with a transversely extending groove or recess to carry a slidably mounted shuttle member or secondary piston 103. The shuttle member 103 is apertured to receive a pin 104 which is mounted eccentrically of the shaft 101 and thus provides the sliding motion for the piston 102 and shuttle 103. At suitable points spaced opposite the shuttle member 103 the rotor is provided with apertures which extend from the outer periphery thereof to the transverse groove through the rotor so that the face of the shuttle member may be placed in communication with the exterior of the rotor. As the rotor 100 revolves with the shaft 101 the eccentrically mounted pin 104 causes a reciprocating movement of the piston member 102 in the groove of the rotor and at the same time causes a transverse reciprocating motion of the shuttle 103 in the groove of the piston. The reciprocation of the piston member and shuttle will cause a charge of plastic material to be picked up by each of its members as they pass adjacent the intake port 98 which charge is evacuated at a discharge port 105.

From the discharge port 105 plastic material is advanced as a continuously moving stream to a flow director which successively transmits the entire stream to each of a plurality of forming openings such as the nozzles 2 and 3. In the form of the invention shown, the flow director comprises a conical valve 106 carried by an oscillating shaft 107 which may be driven by any suitable mechanism (not shown) in proper timed relation. The oscillating shaft 107 may conveniently be disposed within a stationary tube 108 secured to the frame member 72 (see Figs. 13 and 14). The valve 106, shown best in Figs. 3 and 4, is provided with curved surfaces 109 which define passageways leading from the discharge port 105 to the nozzles 2 and 3.

To enclose the passages through the housing 1 a cover plate 110 is provided and an accumulator may be mounted in the cover plate to take care of the flow of plastic from the metering device during the oscillation of the valve 106. The accumulator may comprise a diaphragm 111 mounted on an annular ledge or surface surrounding an aperture through the cover plate 110 and may be held in place by a cap member 112 bolted to the cover plate with the use of suitable clamp members 113 (see Fig. 2). Disposed within the cap member 112 is a plunger 114 mounted for sliding movement with respect to the cap member and serving to actuate the diaphragm 111 and close or open the accumulator pocket. The plunger 114 may be driven in timed relation with other portions of the mechanism by being pivotally connected to a lever 115 intermediate the ends of the lever. One free end of the lever is pivotally connected to a bracket 116 mounted on the cap member 112 and the other free end of the lever may be pivotally connected to a reciprocating rod 117 journaled in the casing 1 and driven by any suitable mechanism (not shown). As the rod 117 is reciprocated the plunger is alternately raised and lowered to flex the diaphragm and open or close the accumulator pocket.

The reciprocating rod 117 is timed so that when the valve 106 begins to oscillate to change the flow of the stream of plastic from one of the nozzles 2 and 3 to the other one, the plunger 114 is raised from its lowermost position where it flexed and retained the diaphragm substantially flush with the under surface of the cover plate 110. Raising the plunger permits the diaphragm to rise and open the pocket to temporarily receive the full amount of flow of plastic material from the metering device. When the valve has completed its oscillation and is open to the forming nozzle, the reciprocating rod 117 may be lowered to cause the plunger to flex the diaphragm to its downward position evacuating plastic material from the accumulator pocket and returning it to the stream of plastic flowing to the forming nozzle.

To permit an adjustment in the rate of flow from the metering device it is only necessary to vary the eccentricity of the pin 104 with respect to the rotor shaft 101. As the eccentric pin is moved towards a position of concentricity with the axis of the rotor, the length of stroke of the reciprocating piston 102 and of the shuttle 103 decreases. The size of the charge picked up by the piston and shuttle at the intake port is smaller and accordingly the flow of plastic from the metering device is decreased. To vary the eccentricity of the pin 104 it may be mounted eccentrically with respect to a cylindrical support and cap member 118 disposed for oscillating movement in an aperture through the cover plate 110. The member 118 is provided with a handle 120 movement of which will vary the eccentricity of the pin with respect to the rotor shaft. The member 118 and pin 104 may be held in a desired place by a set screw 121 threadedly mounted in a yoke 122 bolted to the cover plate 110 so that the set screw bears against the member 118 and retains it in a fixed position with respect to the cover plate 110.

It is considered desirable to vary the volume of the accumulator pocket to correspond with the rate of flow from the metering device and to accomplish this the bracket 116 may be adjustably mounted on the cap member 112. At the same time the lever 115 may be slotted in the region of its pivotal connection to the plunger 114 and the reciprocating rod 117. As the bracket member 116 is moved the length of the respective lever arms by which the plunger is driven is varied, changing the stroke of the plunger and accordingly, the volume of the opening of the accumulator pocket. The adjustment of the metering device and of the accumulator pocket may be simultaneously accomplished by pivotally connecting one end of a link 123 to the member 118 and pivotally connecting its opposite end to the bracket 116. As the handle 120 is moved to change the flow of the metering device, the link 123 will adjust the bracket 116 to provide the desired corresponding volume of the accumulator pocket.

The definition or depositing of the plastic mass from the stream of plastic may be accomplished in several ways. When relatively stiff plastics are being handled the mass may be sheared by withdrawal of the support member from the nozzle with the wrapper enclosed and held about the mass. Where precise accuracy of the masses is desired or where softer plastic materials are being formed a severing means which passes across or closes completely the end face of the forming nozzle may be preferred.

The method of completing the enclosure of the plastic masses by the wrappers to provide a completed package is not considered to be an essential part of the present invention. The drawings and description do illustrate a preferred embodiment of a method of and apparatus for selecting, withdrawing, feeding and applying sheet material articles such as wrappers.

The present invention is considered extremely advantageous for supplying a sequence of sheet material articles which may be applied in precise accurate alignment with a predetermined position of use. The object or commodity with which the article is to be associated may always be uniformly located with respect to the edges of the article. Both the articles and the commodity with which they are associated may have increased regularity and uniformity of appearance with lowered costs and high speed production.

The selection and feeding of only single articles is facilitated, since they may be supported in nested relationship with their marginal edges in stepped or echeloned configuration. The stepped or echeloned edges obviate clinging between adjacent wrappers and permit quick entry of air at such edges as the leading one is withdrawn by flexing its edge portions.

With the articles stacked or nested, the supply may be readily replenished and without interrupting the operation for which the articles are to be utilized. When the forming and packaging operation is to be conducted in connection with a product made by a continuous process, this is an especially desirable feature since interruptions of the continuous process are costly and in addition may adversely affect the composition or physical characteristics of the commodity.

When the articles are enwrapments or enclosures, a corner edge of the commodity or object may be accurately deposited onto the trough-like article and the balance of the packaging operations may be readily and conveniently carried out. Further, it is possible to package relatively soft plastic masses with a more rigid and protective sheet material than can be done commercially with present day methods. When wrappers are disposed and supplied as described the amount of folding necessary to complete a package is decreased.

It may be desirable to incorporate in the articles prior to their use, any of various means which will contribute to and simplify their use. For example, it is contemplated that prescoring along fold lines of wrappers may be advantageous to facilitate the making and retention of the various folds necessary to provide a completed package. This may be more desirable with the more rigid sheet materials. Also, the incorporation of a score line defining the edge portions of the wrapper at the position of the outer extremity of the individual plastic mass will assist in the closing of the apex of the trough-like wrapper. Further, it will assist in retaining the closed end of the wrapper which as described, is done to prevent movement of the plastic mass.

It will be appreciated that in the drawings, proportions have been exaggerated in some instances to provide a greater understanding of the invention.

It will be understood that the foregoing description of preferred embodiments of the invention is for the purpose of explanation and illustration and numerous variations and modifications other than those which have been described may be made without departing from the spirit of the invention.

What I claim is:

1. The method of supplying a sequence of sheet material articles having angularly disposed surfaces which comprises, supporting a plurality of such articles in a stack, successively engaging and taking hold of the angularly disposed surfaces of the leading article in said stack, successively withdrawing leading articles from the stack, and successively advancing and positioning said articles to a predetermined location with their angularly disposed surfaces in registry with generally similar surfaces of a plurality of support members.

2. The method of furnishing a plurality of sheet material articles folded to V-shaped configuration along a line intermediate of opposite marginal edges of said articles which comprises, supporting a plurality of said articles disposed in a stack with the fold lines thereof in parallel relationship, extracting the leading one of said articles by flexing marginal edge portions of said article, withdrawing said article, and supplying the same to a support member with said fold line in registry with a predetermined location on said support member.

3. The method of furnishing trough-like sheet material articles which comprises, supporting a plurality of said articles in nested relationship, extending a member having a generally convex surface into engagement with the leading one of said articles, taking hold of said article and withdrawing said member, advancing said member while holding said article thereto, applying said article to a predetermined position on a support having a generally concave surface, and releasing the hold of said article by said member.

4. In the method of supplying sheet material articles having a fold line and angularly disposed portions extending outwardly from said fold line, the steps which comprise, supporting a plurality of said articles in nested relationship with the sides of the articles divergent, extracting a single one of said articles by converging opposite side portions of the leading one of said articles, and withdrawing the same from the plurality of nested articles while holding said opposite side portions in converging relation.

5. The method of supplying sheet material articles having a trough-like configuration which comprises supporting a plurality of said articles in nested relationship with opposite marginal side edges thereof in echeloned arrangement and with apexes of said articles superposed, moving portions of the leading one of said articles to free marginal edges thereof from said echeloned arrangement, withdrawing the leading one of said articles, advancing the same in the general direction of the axis of said trough-like configuration, and applying the apex of said article in registry with a receiving surface.

6. The method of supplying sheet material articles having a V-shaped configuration which comprises, withdrawing the bottom one of said articles from a plurality of articles nested and disposed with their sides divergent in a downward direction, advancing said article while maintaining the sides divergent, and applying the article to a pair of angular receiving surfaces generally complementary to the divergent arrangement of said article, with the apex of said article in registry with the apex of said receiving surfaces.

7. The method of furnishing sheet material articles which comprises, supporting a plurality of such articles having outer edges in superposed position and with opposite sides divergent, retaining said articles by elements engaging said outer edges, contacting sides of a leading one of said articles, converging outer edges of said leading article to remove said outer edges from said elements, withdrawing said article, advancing the same to a predetermined position, applying the sides of said article in registry at said predetermined position, and diverging said outer edges of said article.

8. The method of furnishing sheet material articles having a fold line intermediate of opposite marginal edges thereof which comprises, supporting a plurality of such articles with the fold lines thereof in superpositioned relationship, withdrawing the leading one of said articles, advancing the same in a direction generally corresponding to the direction of said fold lines, depositing said article in a support member with said fold line in registry with a predetermined line of said support member, and advancing said support member in a direction transversely of said fold line.

9. The method of supplying a sequence of V-shaped wrappers which comprises, supporting a plurality of said wrappers in nested relationship with their sides divergent, successively converging side edge portions of leading ones of said wrappers to extricate the leading wrapper from said support, successively positioning the apex of each of said wrappers in precise registry with the apex of a generally complementary receiving support, and holding said wrappers to said receiving supports whereby a commodity may be placed at a predetermined position on each of said wrappers.

10. Apparatus for supplying a sequence of sheet material articles each of which has angularly disposed surfaces and an intermediate fold which comprises, a support to retain a plurality of said articles in nested relation with said angularly disposed surfaces divergent and said folds superposed, a plurality of feed members mounted for movement in an endless path passing adjacent to said support, mechanism to cause said feed members to take hold of and pluck leading ones of said articles from said support, a plurality of receiving members mounted for movement in an endless path passing adjacent the path of said feed members, and means for bringing said feed members and articles into juxtaposition with said receiving members to transfer said articles to said receiving members.

11. Apparatus for supplying V-shaped articles which comprises, a supporting container to retain a plurality of divergent V-shaped articles disposed in nested relationship, elements carried by said support to engage and retain portions of the edges of divergent sides of said articles, a transfer member having angularly disposed side faces and movable into engagement with the leading one of said articles, means for holding portions of said leading article to portions of said transfer member, means for varying the angularity of side portions of said transfer member to release side edges of said article from said elements, an article-receiving support disposed at a receiving station to which said transfer member is movable, said receiving member having angularly disposed surfaces generally complementary to those of said article and transfer member, and means for moving said transfer member with respect to said receiving member to permit said transfer member to deposit said article in said receiving member.

12. Apparatus for supplying wrappers folded to a V-shaped configuration which comprises, a support for retaining a supply of said wrappers with said wrappers held in nested relation with their sides divergent and directed generally downwardly, a feed member having angularly disposed surfaces to enter and extricate a lowermost of said wrappers, and a pair of receiving surfaces generally complementary with the angularly disposed surfaces of said feed member to which said wrapper is applied for use whereby said wrappers may be accurately aligned with said receiving surfaces.

13. In apparatus for feeding sheet material articles each having angularly disposed surfaces and an intermediate fold, a support to hold a plurality of such articles with the folds thereof superposed, a feed member movable into contact with a leading one of said plurality of articles, at least one movable element carried by said member to flex a portion of said leading article to extricate the same from said support, a receiving member cooperable with said feed member to receive and take hold of articles withdrawn by said feed member from said support, and means for holding said movable element with a portion of said leading article flexed until said article is deposited in said receiving member.

14. In apparatus for feeding sheet material articles having a V-shaped configuration, a support to retain a plurality of articles in nested divergent relationship, a feed member having angularly disposed surfaces to enter the divergent sides of the leading article in said support, means for holding said article to said member, a receiving member to which said feed member applies said article, said feed member having elements which move while holding said article to extricate edge portions of the leading article from said support, and means for holding said movable elements after extrication of said leading article and until application of said article to said receiving member.

15. In a method of supplying articles, each of which comprises a section of sheet material having a fold line intermediate its edges, the steps which include supporting by their edges a plurality of said articles in a stack with the fold lines thereof in parallel relation and with the portions of said articles on opposite sides of said fold line in angular relation to render said articles trough-like in form, taking hold of the inner surfaces of the said portions of one of said articles at one end of said stack, flexing the said portions of said one article inwardly away from the inner surfaces of the angularly disposed portions of the next adjacent article in said stack to free the outer edges of said one article and facilitate withdrawing said articles singly.

CLARENCE W. VOGT.

References Cited in the file of this patent

UNITED STATES PATENTS

| Number | Name | Date |
|---|---|---|
| 768,462 | Juengst | Aug. 23, 1904 |
| 768,463 | Juengst | Aug. 23, 1904 |
| 853,910 | Tyden | May 14, 1907 |
| 1,429,095 | Peters | Sept. 12, 1922 |
| 1,571,572 | Craig | Feb. 2, 1926 |
| 1,976,892 | Shoemaker | Oct. 16, 1934 |
| 1,990,148 | Tevander | Feb. 5, 1935 |
| 2,304,146 | Brinton | Dec. 8, 1942 |
| 2,359,432 | McNamara | Oct. 3, 1944 |
| 2,392,799 | Scholes | Jan. 8, 1946 |

FOREIGN PATENTS

| Number | Country | Date |
|---|---|---|
| 143 | Great Britain | of 1859 |
| 338,378 | Great Britain | of 1930 |